Patented Mar. 13, 1934

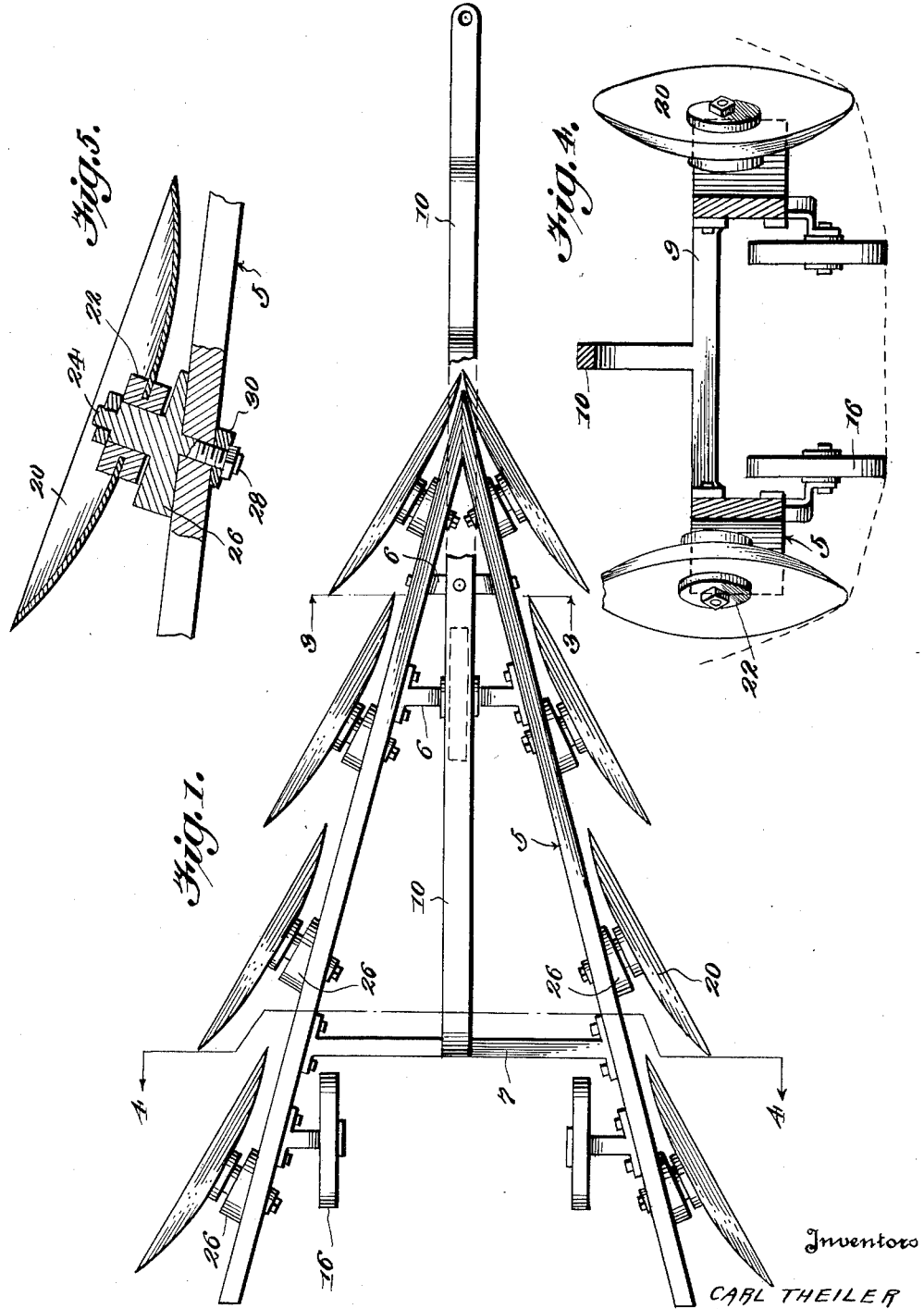

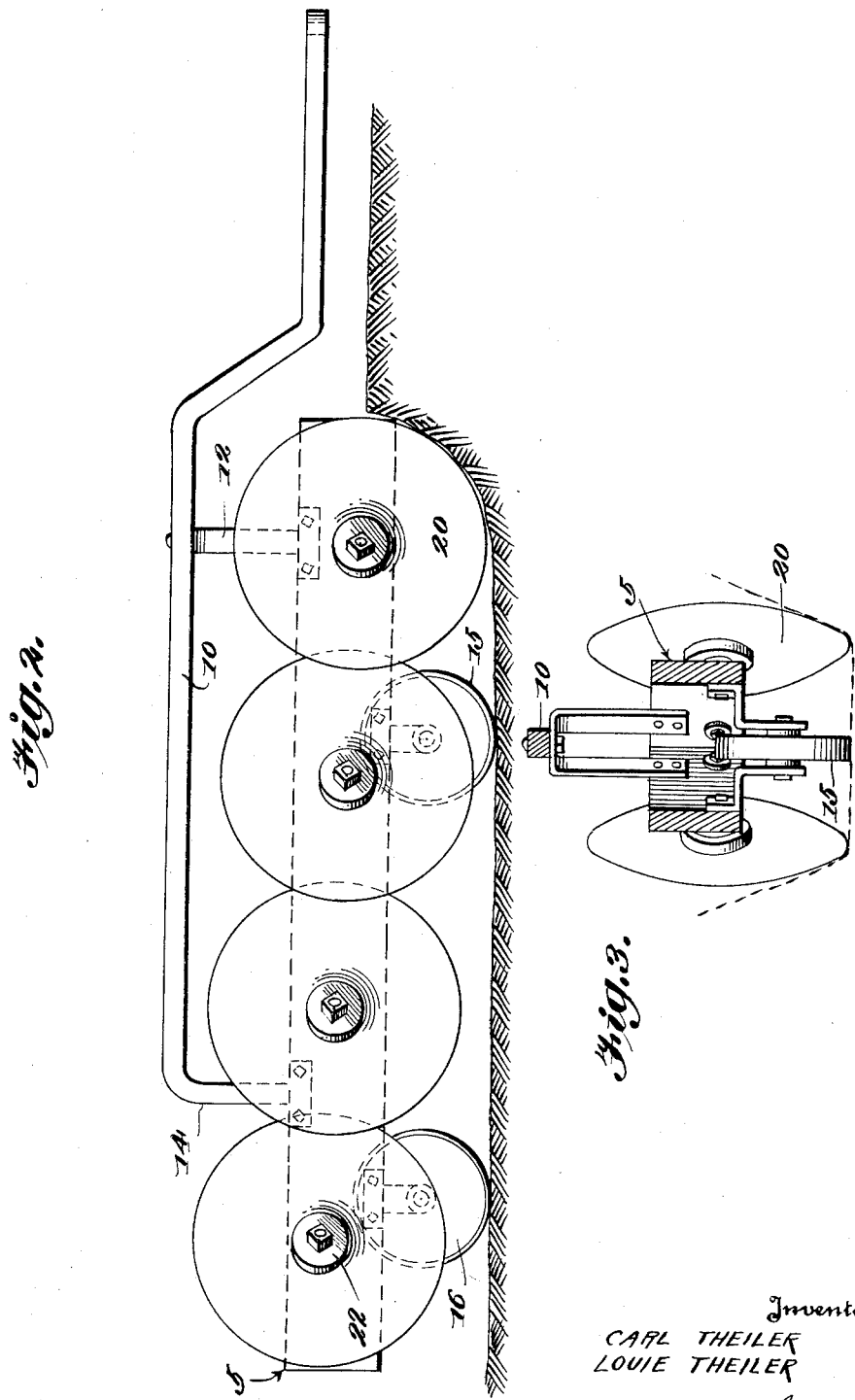

1,951,072

UNITED STATES PATENT OFFICE 1,951,072

PLOW

Carl Theiler and Louie Theiler, Tomahawk, Wis.

Application November 16, 1931, Serial No. 575,365

2 Claims. (Cl. 97—53)

This invention relates to plows especially adapted for use in digging ditches for fire lanes.

More particularly, the invention forming the subject of this application is in the nature of a disc plow in which the rows of disc-shaped cutting elements are arranged in V-shaped formation with the individual discs of the several rows raised or slightly elevated with respect to the discs immediately in advance thereof so that the ditch formed by the plow is diminished in depth toward the sides thereof, this type of ditch being especially advantageous in the formation of fire lanes, although, it is apparent that a plow constructed in accordance with this invention is capable of advantageous use in the making of other types of ditches, for example, irrigation ditches and the like.

Another aim of the invention is to provide a ditch digging plow of the type suggested in which the mounting of the various discs is such that the individual removal of the discs is made a very simple matter to the end that the maintenance and repair of the plow is simplified.

A further object of the invention is to provide a disc plow of the type described, which is of rigid construction, admirably adapted to its intended purpose and which is cheap to manufacture.

Other objects and advantages will be apparent during the course of the following description.

In the accompanying drawings, forming a part of this application and in which like numerals are employed to designate like parts throughout the same, Figure 1 is a fragmentary plan view of a plow constructed in accordance with the invention, Figure 2 is a side elevation of the improved plow, Figure 3 is a vertical, transverse section taken on line 3—3 of Figure 1, Figure 4 is a vertical, transverse sectional view taken on line 4—4 of Figure 1, Figure 5 is a detailed horizontal sectional view illustrating the supporting means for the individual cutting disc.

In the drawings, wherein for the purpose of illustration is shown a preferred embodiment of the invention, the numeral 5 generally designates a frame of V-shaped formation having diverging side members, the side members being joined by front and rear cross beams 6 and 7, respectively.

As shown in Figures 1 and 2, a draw bar 10 is extended centrally and longitudinally along the top of the frame and is provided with depending legs 12 and 14 by which the draw bar is attached to the front and rear cross beams 6 and 7 respectively. In Figure 2, the forward portion of the draw bar 10 is shown to be offset downward for connection with a draft appliance such as a tractor.

A single front wheel 15 and a pair of laterally spaced rear wheels 16 provide a means for supporting the plow, while being moved from place to place.

The diverging sides of the frame 5 support rows of cutting elements in the form of concavo-convex discs 20 arranged on edge and having the central portions thereof provided with bearings 22. Figure 5 illustrates that the bearings 22 are mounted on the spindles 24 of attaching plates 26, the attaching plates being provided with attaching bolts 28 extended through the sides of the frame and secured thereto by fastening nuts 30 or any other suitable means.

Figures 1 and 5 illustrate that the attaching plates 26 are increased in thickness in the direction of the rear end of the plow so that the spindles 24 are disposed in parallel planes.

Now, with reference to Figure 2, it will be seen that the spindle 24 and the disc shaped cutting elements 20 mounted on the spindle are elevated progressively toward the rear end of the frame so that the ditch made by the plow will diminish in depth toward the sides thereof. In other words, a ditch formed by the improved plow will be substantially V-shaped in cross section, a formation that has been found to be especially advantageous in fire ditches. With reference to Figure 1, it will be seen that the foremost cutting discs 20 have the forward portions thereof rather close together for cutting the central portion of the ditch.

Figure 1 also illustrates that the cutting elements 20 of each row of cutting elements are arranged in overlapping relation so that the dirt picked up by each blade is moved outward and is positioned in the path of travel of the central portion of the following cutting element, and in this manner the loosened dirt is conducted to the outer sides of the ditch.

As might otherwise be expressed, the cutting discs are located in spaced parallel planes and in overlapping relation with each disc positioned above the disc immediately in advance thereof so that the outer discs have a diminished cutting depth.

A plow constructed in accordance with this invention is of highly simplified construction since it has comparatively few parts and since the individual cutting elements may be easily removed singly for the purpose of repair or renewal and since the arrangement is such that the work performed by the various cutting elements is equally distributed. In further adverting to the equal distribution of the work performed by the various discs it is pointed out that while the cutting depth of the discs is decreased toward the rear end of the plow, the rear discs carry an increased amount of dirt picked up by the discs in advance thereof and in this manner the service performed by the various discs is more or less equalized.

It is to be understood that the form of invention herewith shown and described is to be taken merely as a preferred example of the same, and that such minor changes in arrangement and construction of parts may be made as will remain within the spirit of the invention and the scope of what is claimed.

Having thus described the invention, what is claimed is:

1. In a plow having diverging sides, a plurality of longitudinally spaced spindles on said sides, the distance of said spindles from the lower edges of said sides progressively increasing from the front toward the rear thereof, and a plurality of cutting dics of the same diameter rotatably mounted on said spindles in overlapping relation.

2. In a plow having diverging sides, a plurality of laterally extending longitudinally spaced spindles on said sides, the distance of said spindles from the lower edges of said sides progressively increasing from the front toward the rear thereof, a plurality of concavo-convex cutting discs rotatably mounted on said spindles in overlapping relation and in spaced parallel planes, and a draw bar extended centrally along the frame and terminating in advance thereof, and supporting wheels carried by the frame.

CARL THEILER.
LOUIE THEILER.